(12) United States Patent
Kawano et al.

(10) Patent No.: US 8,751,534 B2
(45) Date of Patent: Jun. 10, 2014

(54) METHOD AND APPARATUS FOR MANAGING FILE

(75) Inventors: Atsushi Kawano, Kawasaki (JP); Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 12/652,693

(22) Filed: Jan. 5, 2010

(65) Prior Publication Data

US 2010/0174751 A1    Jul. 8, 2010

(30) Foreign Application Priority Data

Jan. 7, 2009   (JP) ................................ 2009-001952

(51) Int. Cl.
*G06F 7/00* (2006.01)
*G06F 17/30* (2006.01)

(52) U.S. Cl.
USPC .......................................... 707/783; 707/784

(58) Field of Classification Search
USPC ......... 707/781, 782, 784, 785, 786, 787, 788, 707/783, 792
See application file for complete search history.

(56) References Cited

U.S. PATENT DOCUMENTS

| | | | |
|---|---|---|---|
| 2002/0169826 A1* | 11/2002 | Yano et al. | 709/203 |
| 2006/0212327 A1* | 9/2006 | Norman | 705/8 |
| 2006/0235851 A1 | 10/2006 | Akachi | |
| 2007/0143324 A1* | 6/2007 | Eichhorst | 707/101 |
| 2007/0156693 A1* | 7/2007 | Soin et al. | 707/9 |
| 2007/0285504 A1* | 12/2007 | Hesse | 348/14.08 |
| 2008/0088698 A1* | 4/2008 | Patel et al. | 348/14.09 |
| 2009/0080716 A1* | 3/2009 | Yanagi | 382/118 |
| 2009/0109959 A1* | 4/2009 | Elliott et al. | 370/352 |
| 2010/0315497 A1* | 12/2010 | Jiang | 382/118 |

FOREIGN PATENT DOCUMENTS

| | | |
|---|---|---|
| JP | 2000-043486 A | 2/2000 |
| JP | 2006-092242 A | 4/2006 |
| JP | 2006-303683 A | 11/2006 |
| JP | 2008-217604 A | 9/2008 |

* cited by examiner

*Primary Examiner* — Md. I Uddin
(74) *Attorney, Agent, or Firm* — Canon USA, Inc., IP Division

(57) ABSTRACT

A method for managing a file includes: acquiring at least one personal ID for identifying a person associated with the right to access a file; setting a file operation method depending on whether or not a combination of the acquired personal ID satisfies a condition set for each type of operation for the file; and controlling a file operation based on the set file operation method.

22 Claims, 10 Drawing Sheets

FIG. 4

| T11 FILE NAME (URI) | BROWSE | CHANGE | COPY |
|---|---|---|---|
| GRAPH A | A or B or C | A | A |
| DOCUMENT 1 | B or C | B and C | B and C |
| DOCUMENT 2 | ALL | ALL | ALL | t11, t12, t13, t14

METHOD AND APPARATUS FOR MANAGING FILE

BACKGROUND OF THE INVENTION

1. Field of the Invention

The present invention relates to file management in a remote conference system.

2. Description of the Related Art

In recent years, electronic files such as presentation and documentation files have been used in conventional conferences held atone point or video conference systems interconnecting a plurality of remote locations. Normally, these electronic files are prestored in a predetermined storage device before a conference is started, or carried in a portable storage medium for use in a conference.

In a conventional conference participated by a plurality of members, it has been possible for the members to access an electronic file regardless of whether or not the author thereof attends the conference.

Japanese Patent Application Laid-Open No. 2000-043486 discusses a technique for changing the right to access an electronic file with touch-sensitive input or signature authentication on a software keyboard. This technique is used when accessing a file by using a digital white board in a conference system. However, this technique is not convenient to use since an authenticatable person needs to perform authentication on the white board each time a file is accessed.

Japanese Patent Application Laid-Open No. 2006-303683 (US2006-235851) discusses a technique for changing the right to access a shared electronic file after a user performs login processing from a controller in a video conference system. This technique is not convenient either since it is troublesome for each participant to perform login processing in a conference participated by a plurality of persons.

Further, in a known video conference system, a user changes the right to access an electronic file from the user's identification information and position information identified by a radio transmitter. In a video conference system, a participant at a remote location may access a file. In this case, authentication based on the position information does not work and therefore the participant cannot access the file.

SUMMARY OF THE INVENTION

The present invention is directed to permitting a file associated with a specific person to be accessed only when the specific person is authenticated in a file management system simultaneously accessed by a plurality of persons at one point; permitting a file associated with a specific person to be accessed in a multipoint remote conference system; and easily grasping a status of the file access right.

According to an aspect of the present invention, a method for managing a file includes: acquiring at least one personal ID for identifying a person associated with the right to access a file; setting a file operation method depending on whether or not a combination of the acquired personal ID satisfies a condition set for each type of operation for the file; and controlling a file operation based on the set file operation method.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an exemplary access right management table.

DESCRIPTION OF THE EMBODIMENTS

Various exemplary embodiments, features, and aspects of the invention will be described in detail below with reference to the drawings.

It should be noted that the relative arrangement of the components, the numerical expressions and numerical values set forth in these exemplary embodiments do not limit the scope of the present invention unless it is specifically stated otherwise.

Figure 1:
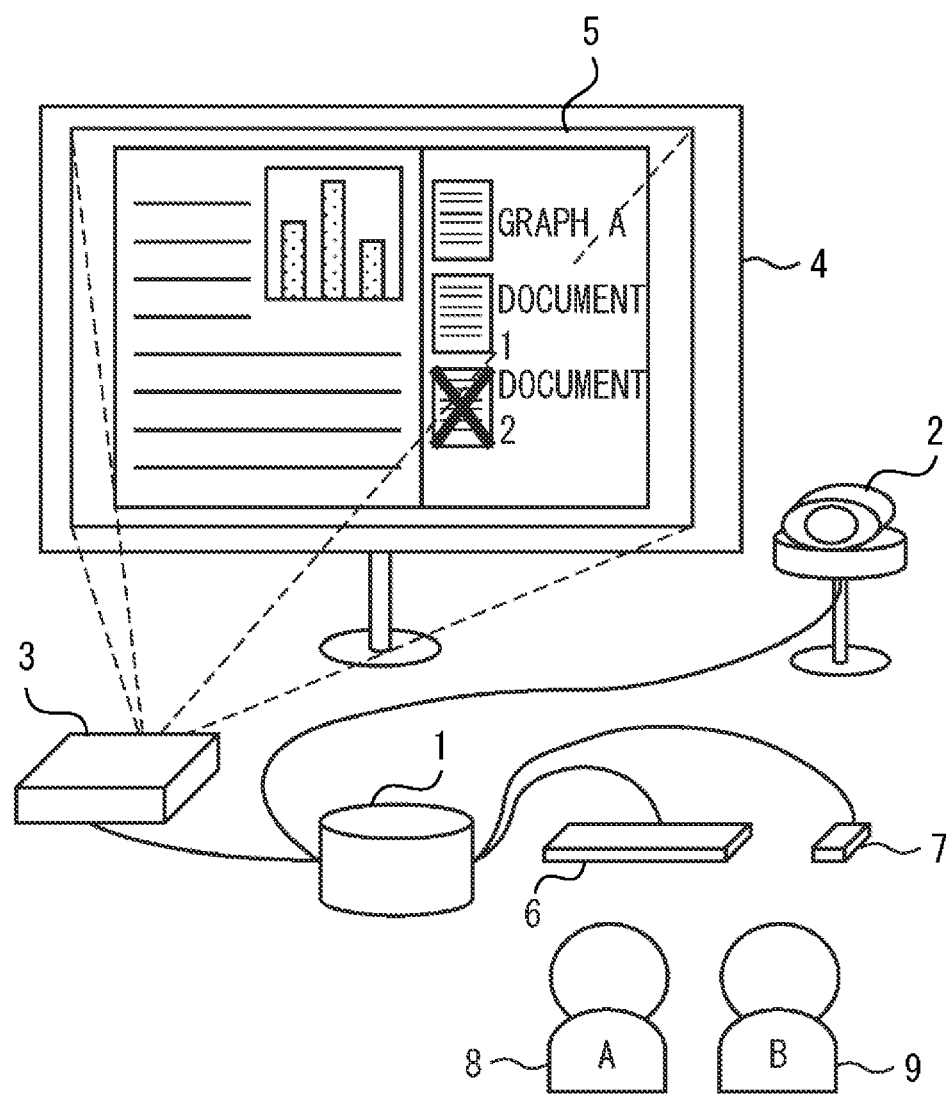
FIG. 1 illustrates an overall configuration of a file management system.

A first exemplary embodiment will be described below based on a file management system in which a file icon is dynamically changed in association with a person at a file sharing terminal used by a plurality of persons to operate files. FIG. 1 illustrates an overall configuration of a file management system. A file management terminal 1 is provided with a camera 2 connected thereto. The camera 2 is oriented toward a person to identify a person 8 and a person 9. The file management terminal 1 projects an image from a projector 3 onto a screen 4. The projector 3 projects an image onto a display screen 5. The display screen 5 displays a file and a list of files. The file management terminal 1 is provided with a keyboard 6 and a mouse 7 as input devices connected thereto.

A typical configuration of the file management system will be described below with reference to FIG. 2. The file management system according to the present exemplary embodiment includes the camera 2 for inputting an image used for personal authentication, the file management terminal 1, and the projector 3 for projecting an image created by the file management terminal 1, all being connected thereto. The file management terminal 1 is provided with the keyboard 6 and the mouse 7 as input devices connected thereto.

The file management terminal 1 includes an input control unit 11, a shared file control unit 12, an output control unit 13, a personal authentication unit 14, an access right management unit 15, an icon creation unit 16, and an access right management table 17. The file management terminal 1 is connected with a personal ID database (DB) 21, an access right database (DB) 22, and a shared file database (DB).

Each database will be described below. The personal ID database 21 is used to store personal IDs and face information for identifying a person in association.

The access right database 22 is used to store personal IDs of authenticated persons and statuses of the access right (operation right) for each file associated with the personal IDs. The access right for a target file includes the access right to browse, the access right to change, and the access right to copy the file.

The shared file database 23 is used to store shared files.

Each unit in the file management terminal 1 will be described below. The input control unit 11 connects with the keyboard 6 and the mouse 7 connected thereto to acquire input information necessary to operate a file.

The shared file control unit 12 connects with the input control unit 11 to receive input information. The shared file control unit 12 also connects with the access right database 22 to acquire a status of the access right to a target file. The shared file control unit 12 also connects with the shared file database 23 to control file operations in association with the status of the access right to a target file.

The output control unit 13 connects with the shared file control unit 12 to display files and file operations via the projector 3. The output control unit 13 also connects with the icon creation unit 16 to display file icons via the projector 3.

The personal authentication unit 14 connects with the camera 2 to receive a picked-up image. The personal authentication unit 14 also connects with the personal ID database 21 to retrieve face information of a person from the picked-up image, inquires of the personal ID database 21 for the person, and acquires a relevant personal ID. Personal authentication is not limited to a picked-up image, but may use, for example, a record of entering/leaving a conference room or biometric authentication such as voiceprint, fingerprint, vein, and so on. Personal authentication may also use a personal authentication IC, or may be performed from other input terminals.

The access right management unit 15 connects with the access right database 22 to store in the access right database 22 a personal ID received from the personal authentication unit 14. The access right management unit 15 also connects with the shared file database 23 to create the access right management table 17 for determining the access right from file information. The access right management unit 15 determines the type of access right from the personal ID with reference to the access right management table 17 and stores it in the access right database 22.

The icon creation unit 16 connects with the access right management unit 15 to receive an access right change notification. Upon reception of the access right change notification, the icon creation unit 16 connects with the access right database 22 to acquire a status of the file access right and then create an icon associated therewith.

The file management terminal 1 can be an ordinary personal computer, and does not denote a particular terminal. The projector 3 is a display device such as a cathode-ray tube (CRT) and a liquid crystal display, and is not limited to a particular display device. The camera 2 is an input device for performing personal authentication, and is not limited to a camera. The keyboard 6 and the mouse 7 are devices for inputting user operations, and are not limited to particular input devices.

Figure 2:
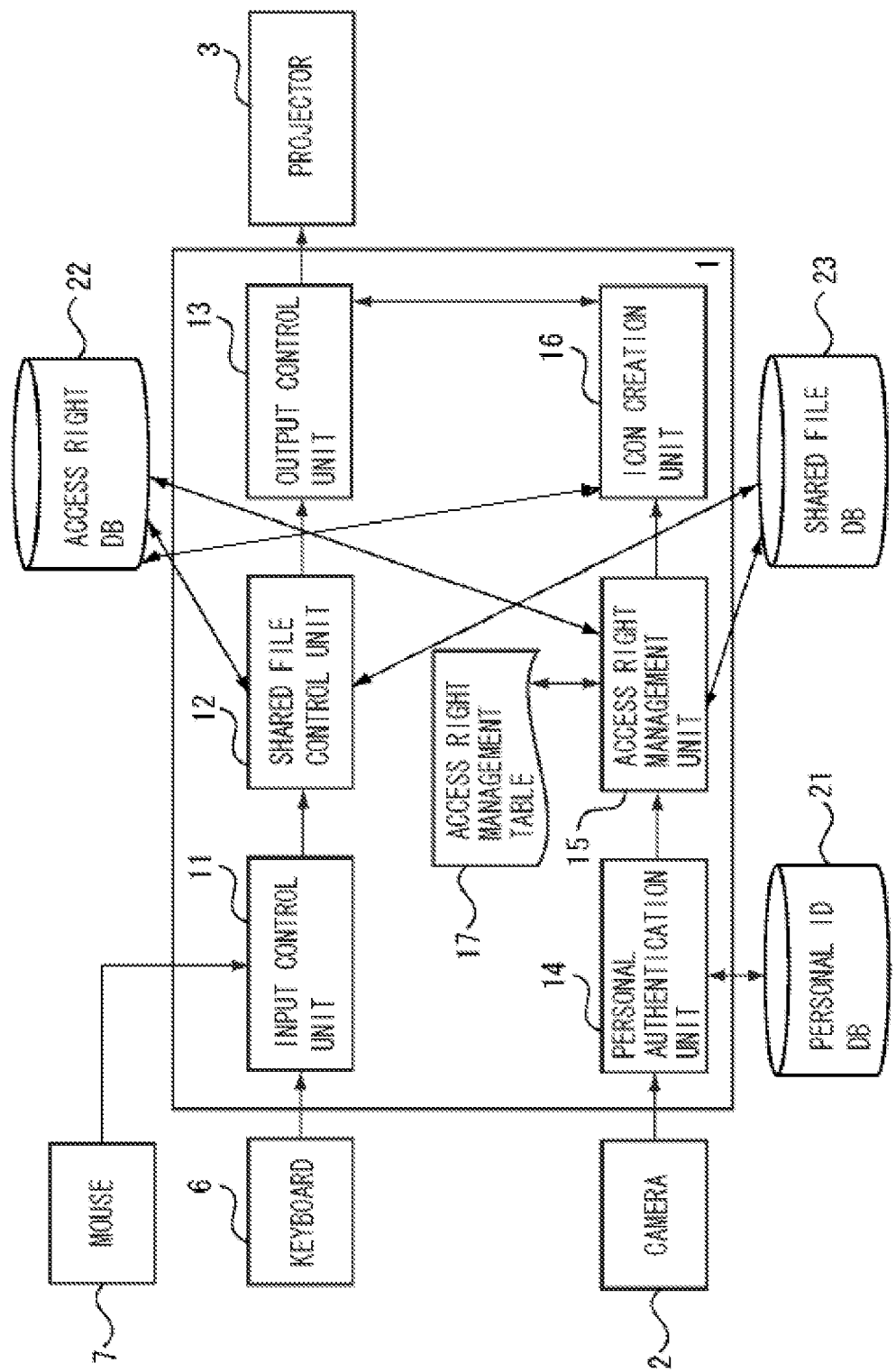
FIG. 2 illustrates a configuration of the file management system.

The personal ID database 21 can be provided within the file management terminal 1, and is not limited to the file management terminal having the configuration illustrated in FIG. 2. The access right database 22 can be provided in the file management terminal 1, and is not limited to the file management terminal having the configuration illustrated in FIG. 2. The shared file database 23 can be configured in the file management terminal 1, and is not limited to the file management terminal 1 having the configuration illustrated in FIG. 2.

Figure 3:
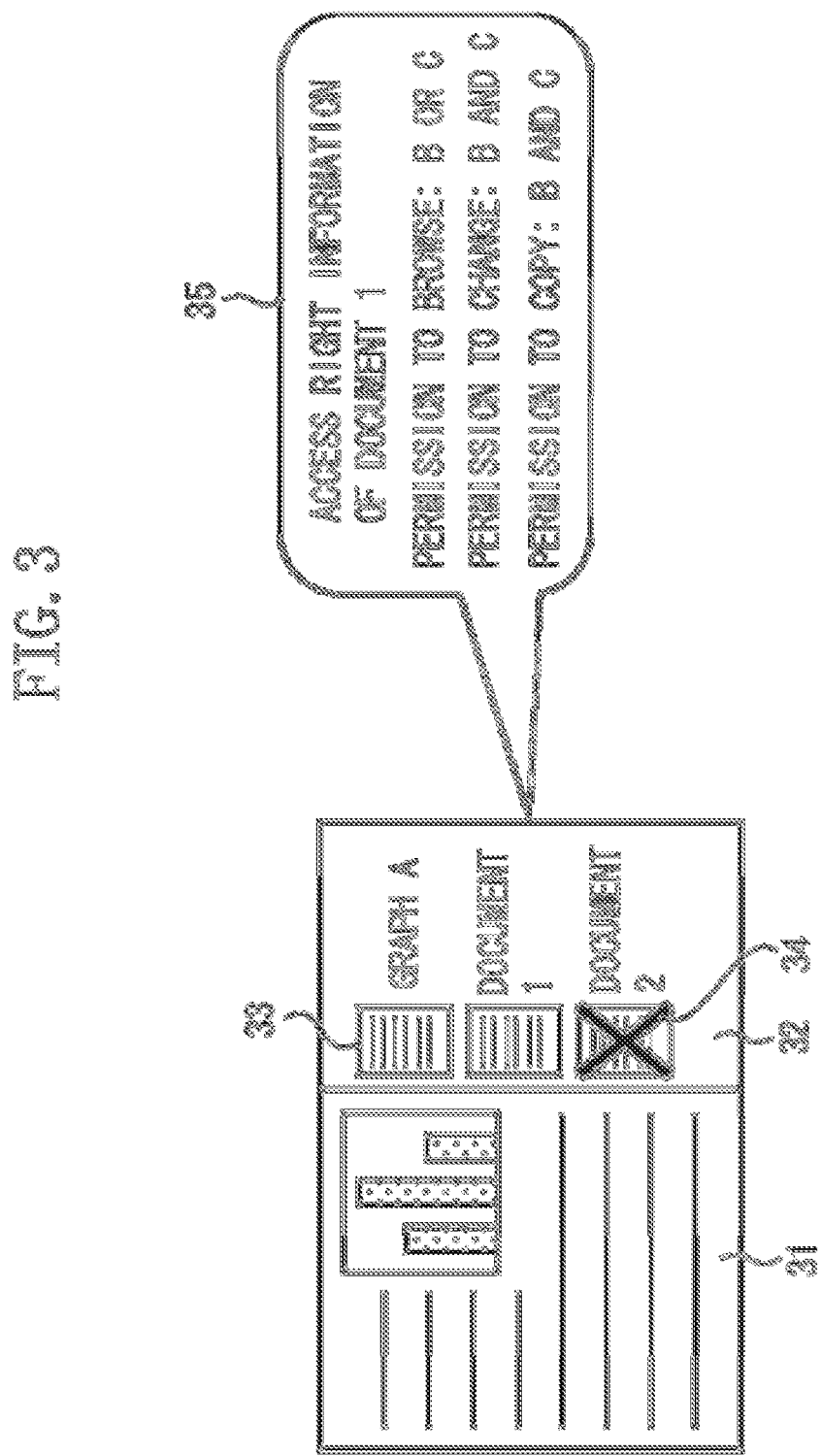
FIG. 3 illustrates an exemplary user interface.

An exemplary display screen is illustrated in FIG. 3. The file display area 31 displays the contents of a selected file. The list display area 32 displays icons of shared files. These icons are associated with the access right for respective files. In the example illustrated in FIG. 3, when a file is permitted to be browsed, its icon is normally displayed like an icon 33. When a file is not permitted to be browsed, its icon is marked x like an icon 34. The icon display for a file dynamically changes depending on the status of the access right for the file. A pop-up window 35 displays access right information for each file denoted by the icon. The pop-up window 35 appears when the cursor of the mouse 7 is moved onto an icon, or when a preset key on the keyboard 6 is pressed.

The marking of the icon for a file not permitted to be browsed is not limited to the mark x, but the icon may be grayed out or outlined. In other words, any types of icons can be used as long as the status of the access right can be easily identified. When a file is permitted to be changed or copied, the file is supplied with a mark denoting the permission of change or a mark denoting the permission of copying, respectively. However, in addition to these marks, any types of icons can be used as long as the status, i.e., the permission of the change and the permission of the copying, can be easily identified. The access right information for each file is not limited to display in the pop-up window 35, but may be displayed, for example, in a status bar at the bottom of the screen.

Procedures for determining the access right will be described below with reference to FIG. 4. The access right is determined using the access right management table 17. Procedures for creating the access right management table 17 will be mentioned later in the description of a flow chart. A column t11 in the access right management table 17 denotes a file name. A column t12 denotes a combination of personal IDs for validating the access right to browse a file. A column t13 denotes a combination of personal IDs for validating the access right to change a file, that is, update or overwrite it. A column t14 denotes a combination of personal IDs for validating the access right to copy a file.

Suppose that a person A has a personal ID A, a person B has a personal ID B, and a person C has a personal ID C. In this case, the access right management table 17 illustrated in FIG. 4 represents the following conditions: The access right to browse a file "Graph A" is validated when a person having the personal ID A, a person having the personal ID B, or a person having the personal ID C is authenticated. The access right to change the file "Graph A" is validated only when a person having the personal ID A is authenticated. The access right to copy the file "Graph A" is validated only when a person having the personal ID A is authenticated.

The access right to browse a file "Document 1" is validated when a person having the personal ID B or a person having the personal ID C is authenticated. The access right to change the file "Document 1" is validated only when a person having the personal ID B and a person having the personal ID C are authenticated. The access right to copy the file "Document 1" is validated only when a person having the personal ID B and a person having the personal ID C are authenticated. When a file "Document 2" shows the personal ID conditions "ALL", the access right to browse, the access right to change, and the access right to copy the file are given to any person.

Figure 5:
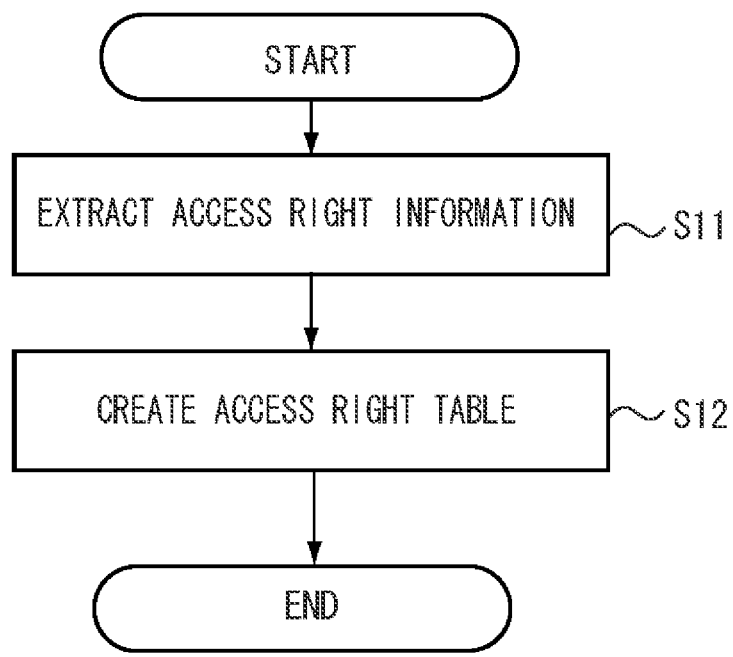
FIG. 5 is a flow chart of processing for creating the access right management table.
Figure 6:
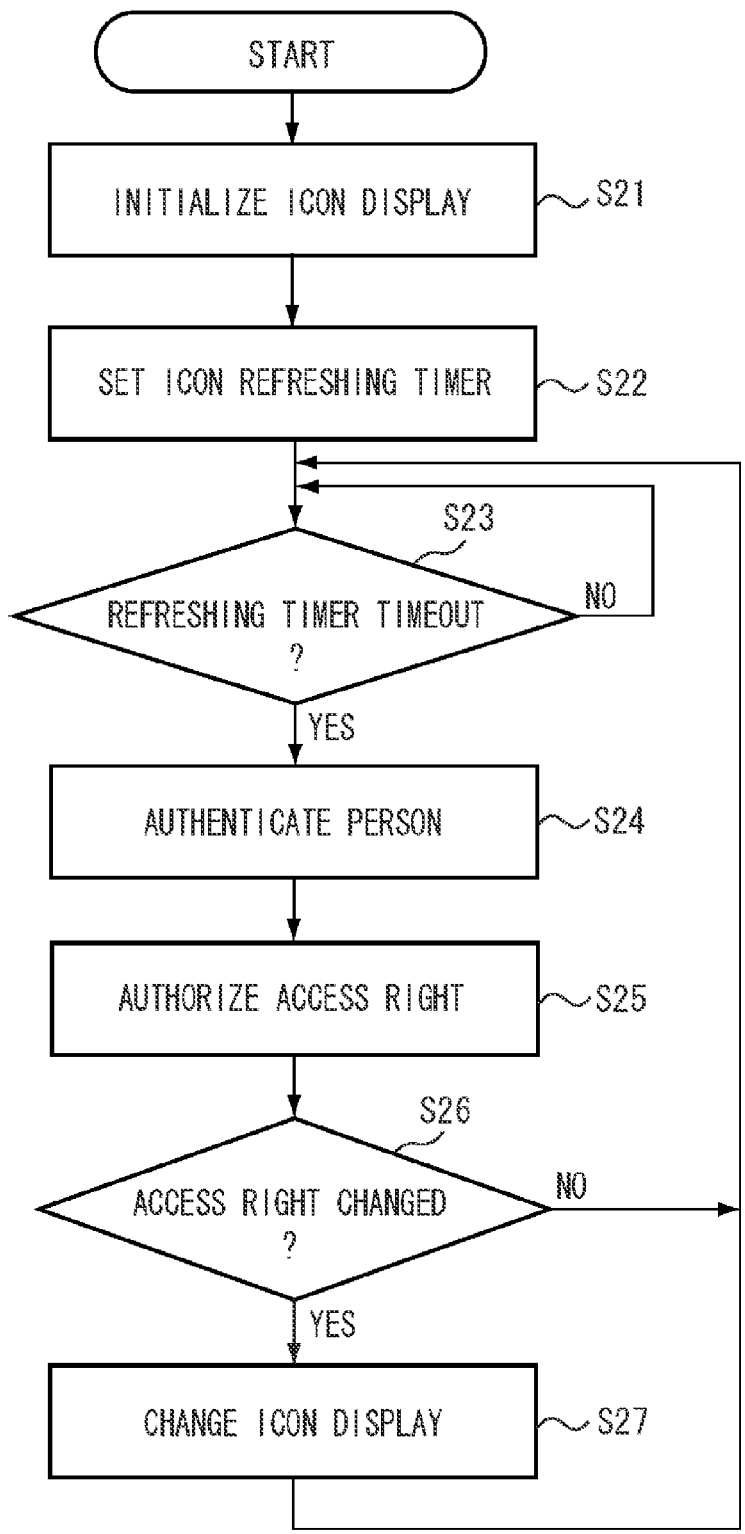
FIG. 6 is a flow chart of processing for changing icon display.

Processing by the file management terminal 1 will be described below. The flow charts of FIGS. 5 and 6 are performed when the CPU of the file management terminal 1 executes a relevant program stored in a read-only memory (ROM) or built-in storage device. FIG. 5 is a flow chart of processing for creating the access right management table 17. In step S11, when file sharing starts, the program extracts the access right information from a file stored in the shared file database 23. The author of the file sets the access right information in the file when storing it in the shared file database 23. When the access right is not set in a file, the author of the file sets the access right when storing it in the shared file database 23.

In step S12, the program creates the access right management table 17 from the extracted access right information. The access right management table 17 is created by the above operations. The program performs the above-mentioned processing for creating the access right management table 17 not only when file sharing starts but also when the number of files in a shared folder is increased or decreased.

FIG. 6 is a flow chart of processing for changing icon display. The program refreshes icon display at fixed intervals by using an icon refresh timer. In step S21, when file sharing starts, the program initializes icon display. In step S22, the program sets a timeout value of the icon refresh timer. In step S23, the program determines whether or not timeout of the icon refresh timer occurs. When timeout occurs, the program proceeds to step S24 to perform personal authentication and then store a result of the authentication in the personal ID database 21.

In step S25, depending on the result of personal authentication, the program sets the access right for each file with reference to the access right management table 17 based on an acquired personal ID and then stores the access right in the access right database 22. In step S26, the program determines whether or not the access right is changed. When the access right is changed, the program proceeds to step S27 to refresh icon display. When the access right is not changed, the program returns to step S23 to determine whether or not timeout of the icon refresh timer occurs again. The program refreshes icon display according to the above-mentioned flow chart. Timing of refreshing the icon display is not limited to refreshing by the icon refresh timer. The icon display can also be refreshed when the status of personal authentication has changed as a result of personal authentication performed at fixed intervals.

Figure 7:
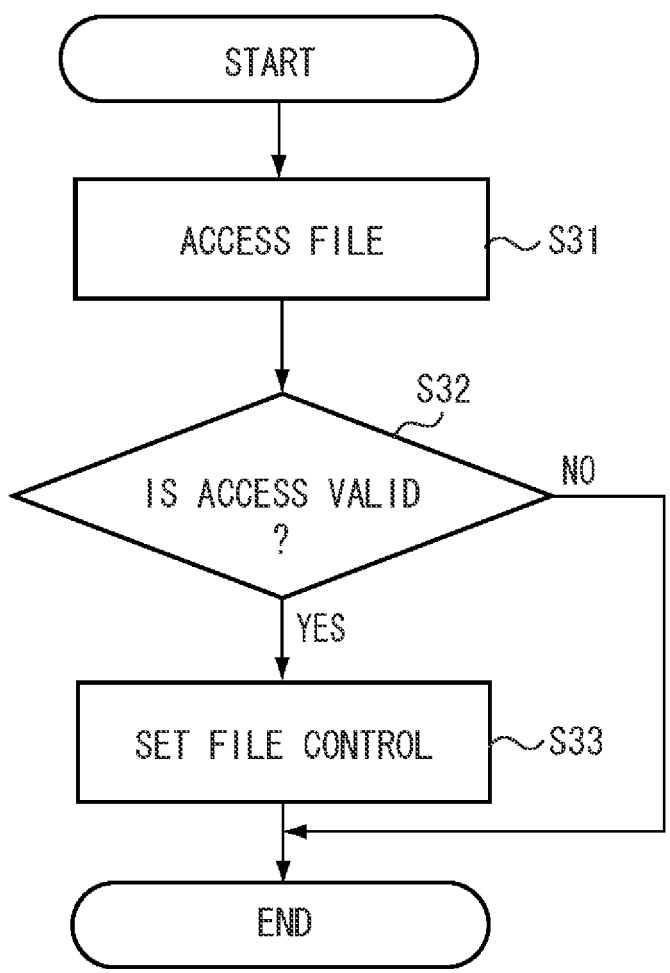
FIG. 7 is a flow chart of processing for accessing a file.

Processing for accessing a file will be described below with reference to the flow chart of FIG. 7. This flow chart is performed when the CPU of the file management terminal executes a relevant program stored in the ROM or built-in storage device. In step S31, the program receives a file access request. In step S32, the program determines whether or not access to a target file is validated. When access to the target file is validated, the program proceeds to step S33 to perform file control setup in association with the status of the access right for the file.

When only the access right to browse a file is validated, for example, the file control setup performs control to permit the file to be browsed but does not permit it to be changed. When the access right to change a file is validated, the file control setup performs control to permit the file to be browsed and changed. In this way, the file control setup performs control to set a control mode to a file in association with the status of the access right for the file. As mentioned above, the first exemplary embodiment makes it possible to dynamically change the file access right and display its icon in association with the access right.

Figure 8:
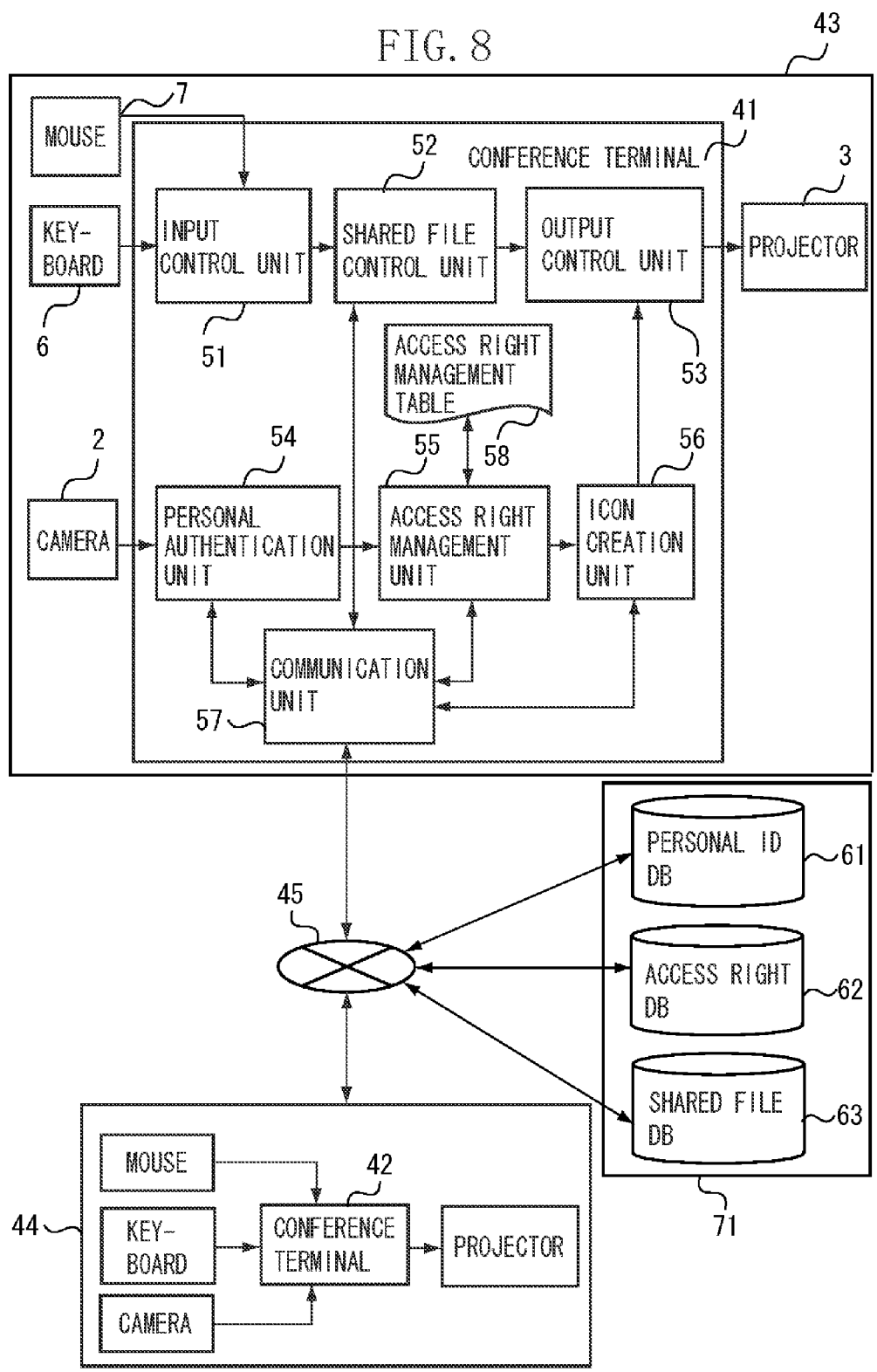
FIG. 8 illustrates an overall configuration of a multipoint remote video conference system.

A second exemplary embodiment will be described below based on procedures for dynamically validating a file according to each participant in a multipoint remote conference system. FIG. 8 illustrates an overall configuration of the multipoint remote video conference system. In the second exemplary embodiment, similar to the first exemplary embodiment, each of conference terminals 41 and 42 includes a projector 3, a camera 2, a mouse 7, and a keyboard 6 connected thereto. Conference locations 43 and 44 are connected via a network 45. The conference terminals 41 and 42 are connected with a conference server 71 which manages a participant ID database 61, an access right database 62, and a shared file database 63 via the network 45.

Each database will be described below. The participant ID database 61 is used to store participant IDs in association with face information for identifying a person. The access right database 62 is used to store participant IDs of authenticated persons and statuses of the access right for each file associated with the personal IDs. The access right for a target file includes the access right to browse, to change, and to copy the file. The shared file database 63 is used to store shared files.

Each unit of the conference terminal 41 will be described below. The conference terminal 41 connects with the participant ID database 61, the access right database 62, and the shared file database 63 via a communication unit 57 to send an inquiry to each database.

An input control unit 51 connects with the keyboard 6 and the mouse 7 to acquire necessary input information for operating a file.

A shared file control unit 52 connects with the input control unit 51 to receive the input information. The shared file control unit 52 also connects with the access right database 62 to acquire a status of the access right for a target file. When the target file is stored in the shared file database 63 at a local point, the shared file control unit 52 connects with the shared file database 63 to control file operations in association with the status of the access right for the target file. When the target file is stored in the shared file database 63 at a remote point, the shared file control unit 52 connects with the shared file database 63 to control file operations in association with the status of the access right for the target file.

An output control unit 53 connects with the shared file control unit 52 to display files and file operations via the projector 3. The output control unit 53 also connects with an icon creation unit 56 to display file icons via the projector 3.

A personal authentication unit 54 connects with the camera 2 to receive a picked-up image. The personal authentication unit 54 also connects with the participant ID database 61 to retrieve face information of a person from the picked-up image, inquires of the participant ID database 61 for the person, and acquires a relevant participant ID.

An access right management unit 55 connects with the shared file database 63 to create an access right management table 58 for determining the access right from file information. The access right management unit 55 also connects with the access right database 62 to store in the access right database 62 a participant ID received from the personal authentication unit 54. The access right management unit 55 acquires a participant ID at a remote point from the communication unit 57 and stores it in the access right database 62. The access right management unit 55 determines the type of access right from the participant ID with reference to the access right management table 17 and stores it in the access right database 62.

The icon creation unit 56 connects with the access right management unit 55 to receive an access right change notification. Upon reception of the access right change notification, the icon creation unit 56 connects with the access right database 62 to acquire a status of the file access right and then create an icon associated therewith.

An identical access right management table 58 is created at each point.

The participant ID database 61 is not limited to that configured in the conference server 71, but may be provided in one conference point or every conference point on the network 45. The access right database 62 is not limited to that configured in the conference server 71, but may be provided in one conference point or every conference point on the network 45. The shared file database 63 is not limited to that configured in the conference server 71, but may be provided in one conference point or every conference point on the network 45. A file display method according to the second exemplary embodiment is similar to that in the first exemplary embodiment.

Procedures for creating the access right management table 58 will be described below. FIG. 5 is a flow chart of processing for creating the access right management table 58.

In step S11, when a conference starts, the program first extracts the access right information from a file stored in the shared file database 63 at local and remote points. The access right setup for a file according to the present exemplary embodiment is similar to that in the first exemplary embodiment. In step S12, the program creates the access right management table 58 from the extracted access right information. An identical access right management table 58 is created at each point.

Figure 9:
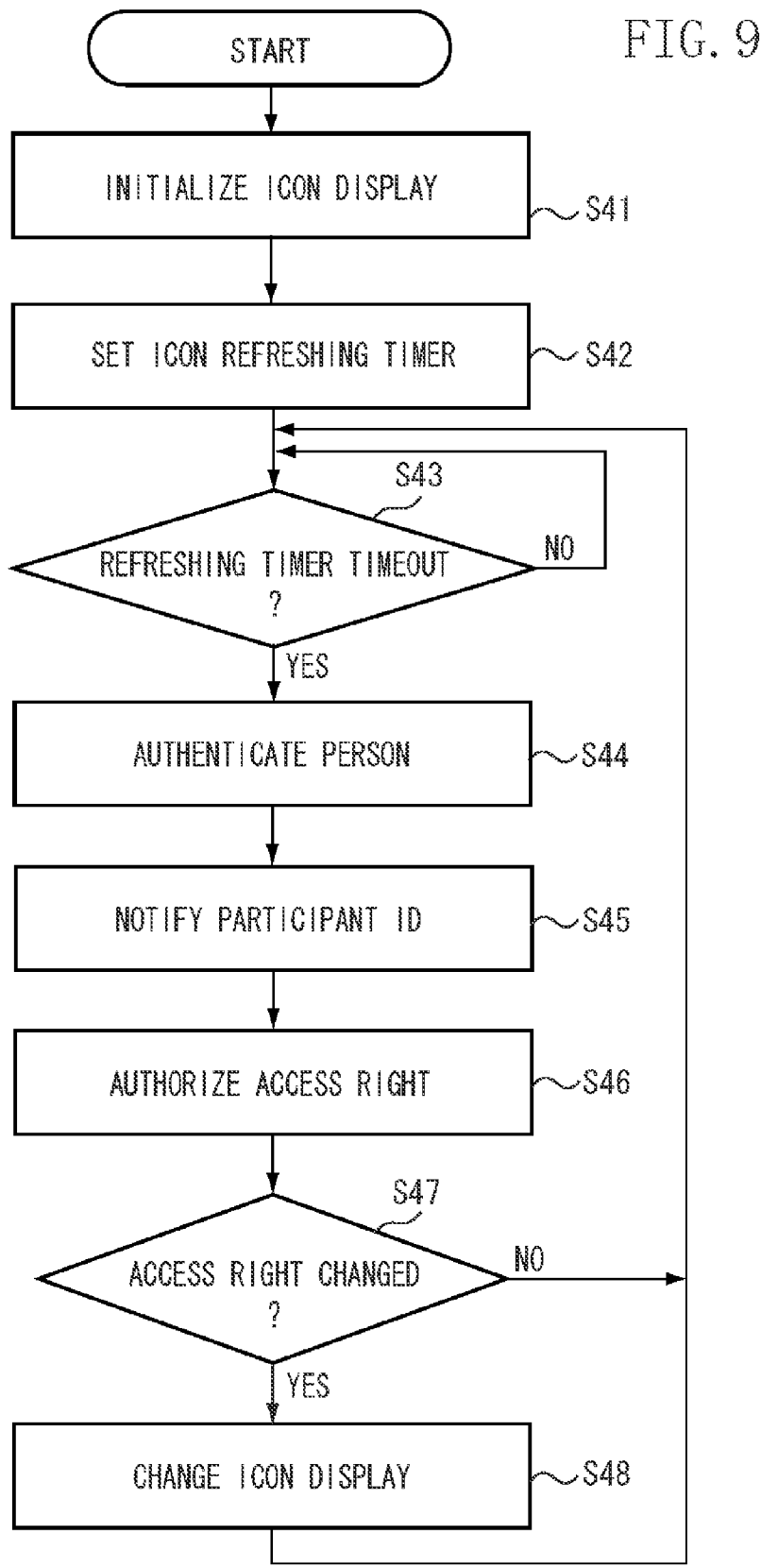
FIG. 9 is a flow chart of processing for displaying an icon.

Processing for changing icon display in a multipoint remote conference system will be described below. The flow chart of FIG. 9 is performed when the CPU of the file management terminal executes a relevant program stored in the ROM or built-in storage device. In step S41, when a conference starts, the program initializes icon display. The program refreshes icon display at fixed intervals by using an icon refresh timer. In step S42, the program sets a timeout value of the icon refresh timer. In step S43, the program determines whether or not timeout of the icon refresh timer occurs. When timeout occurs, the program proceeds to step S44 to perform personal authentication and then store a result of the authentication in the participant ID database 61. In step S45, the program notifies a participant ID to other conference points. Processing performed upon reception of a participant ID will be described later in the description of processing upon reception of a participant ID.

In step S46, the program retrieves the participant ID from the participant ID database 61, sets the access right for each file with reference to the access right management table 58, and stores it in the access right database 62. In step S47, the program determines whether or not the access right is changed. When the access right is changed, the program proceeds to step S48 to refresh icon display. When the access right is not changed, the program returns to step S43 to determine whether or not timeout of the icon refresh timer occurs again. Timing of refreshing icon display is not limited to refreshing by the icon refresh timer. Icon display can also be refreshed when the status of personal authentication has changed as a result of personal authentication performed at fixed intervals.

Figure 10:
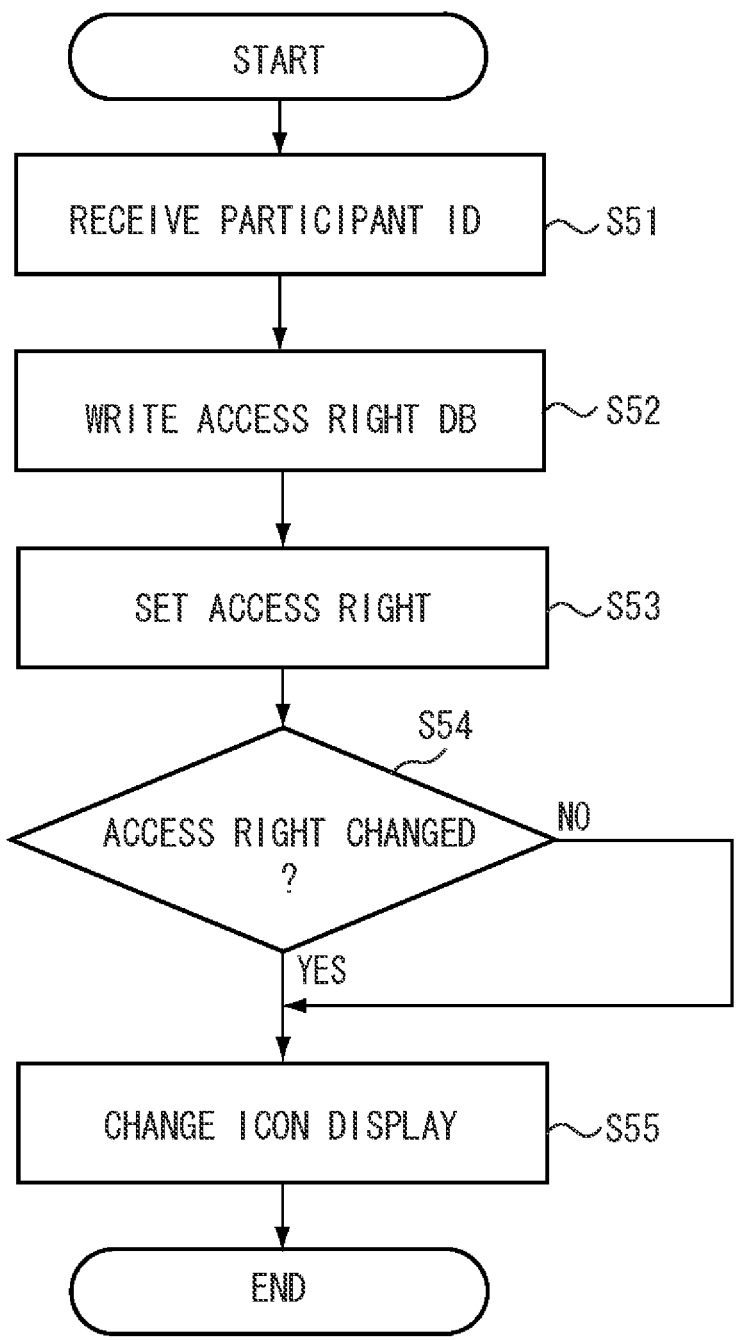
FIG. 10 is a flow chart of processing upon reception of a participant ID.

Processing upon reception of a participant ID will be described below. The flow chart of FIG. 10 is performed when the CPU of the file management terminal executes a relevant program stored in the ROM or built-in storage device.

In step S51, the program receives a participant ID from other points. In step S52, the program updates the participant ID database 61 according to the received participant ID. In step S53, the program retrieves the participant ID from the participant ID database 61, sets the access right for each file with reference to the access right management table 58, and stores it in the access right database 62. In step S54, the program determines whether or not the access right is changed. When the access right is changed, the program proceeds to step S55 to refresh icon display. The program refreshes icon display according to the above-mentioned flow chart.

Processing for accessing a file according to the present exemplary embodiment is similar to that in the first exemplary embodiment. The second exemplary embodiment has specifically been described based on a remote conference system for two points. However, the present invention is not limited to two points, but can also be embodied at three or more points.

In the above-mentioned second exemplary embodiment, participants at both local and remote points can perform the same operation for a file when the relevant access right is validated. The following describes procedures for differentiating the file access right by using a different access right management table 58 at each point, in a multipoint remote video conference system. Further, at each point, icon display for a file is changed in association with the access right for the file.

Since a third exemplary embodiment differs from the second exemplary embodiment only in creation of the access right management table 58, procedures for creating the access right management table 58 will be described below. In the third exemplary embodiment, the access right management table 58 is created from the access right information for each file stored in the shared file database 63. When setting the access right information for each file, conditions for validating the access right are set distinguishing between local and remote points. This condition setup is performed when a file is created and stored or when a file is stored in a shared folder. The access right management table 58 is created based on conditions for validating the access right at the local point with respect to files at the local point, and on conditions for validating the access right at a remote point with respect to files at a remote point. At each point, operation control and icon creation for a file are performed based on respective access right management table 58 created at each point, thus enabling icon display in association with the access right for the file.

In a file management system simultaneously accessed by a plurality of persons, managing persons and files in an association makes it possible to control access to a file even when there is no author thereof, no right holder thereof, or no person in charge of its contents. This enables security protection of files and accordingly improves security functions. Further, the status of a file can be easily grasped in a visible way, for example, by dynamically changing icon display in association with the status of the access right for the file.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-001952 filed Jan. 7, 2009, which is hereby incorporated by reference herein in its entirety.

What is claimed is:

1. A method for managing a file, the method comprising:
periodically receiving image data picked-up and input by a camera oriented toward a plurality of users who are to access a file together in a conference system that is accessed simultaneously by the plurality of users;
identifying a combination of authenticated personal identifications (IDs) of the plurality of users by recognizing faces of the plurality of users in the received image data by referring to a database to acquire a combination of personal IDs as the combination of authenticated personal IDs;
setting an access right to a type of file operation for the file as permitted, in response to the combination of authenticated personal IDs satisfying a predetermined combination of personal IDs for permitting the type of file operation, and cancelling an access right to a type of file operation for the file as not permitted, in response to the authenticated personal IDs not satisfying the predetermined combination of personal IDs for permitting the type of file operation;
storing permitted and not permitted access rights to respective files in association with the authenticated personal IDs in an access right database;
displaying a list of shared file icons of files and a content of a file selected from the list of file icons, wherein each file icon represents the permitted and not permitted access right set for the type of file operation of the file associated with that file icon;
displaying a pop-up window that displays access right information for a file denoted by an icon in response to moving a cursor of a mouse onto the icon;
controlling, using a central processing unit, a file operation for the file by the plurality of users based on the access right set for the type of file operation of the file;
creating, for each of the plurality of displayed shared files, a file icon that graphically conveys determined permitted and not permitted access rights for a shared file;
dynamically changing a displayed file icon in response to change in the permitted and not permitted access right in the access right database for a file associated with that displayed icon; and
receiving instructions from an author of a file during file sharing to change a number of files in a shared folder located in a shared file database and, in response to the number of files in the shared folder located in the shared file database being changed, sending out an access right change notification to icon creation unit to acquire a status of the file access right.

2. The method according to claim 1, further comprising displaying a status of the type of file operation, wherein, to set access to a first type of file operation for the file, the predetermined combination of personal IDs is a union of at least two personal IDs.

3. The method according to claim 1, further comprising creating an icon representing the access right set for the type of file operation of the file and updating a displayed icon with the created icon, if the access right has been changed, wherein creating an icon includes determining whether to create an icon indicating that contents of the file are permitted to be browsed or to create an icon indicating that the contents of the file are not permitted to be browsed.

4. The method according to claim 1, further comprising creating an icon representing the access right set for the type of file operation of the file and updating a displayed icon with the created icon, if the access right has been changed, wherein creating an icon includes creating an icon indicating that contents of the file are permitted to be edited.

5. The method according to claim 1, further comprising creating an icon representing the access right set for the type of file operation of the file and updating a displayed icon with the created icon, if the access right has been changed, wherein access to the conference system by the plurality of users is from one conference location, and wherein creating an icon includes creating an icon indicating that the file is permitted to be copied.

6. The method according to claim 1, wherein access to the conference system by the plurality of users is disbursed among multiple conference locations that are remote from each other, the method further comprising sharing the file between the multiple conference locations based on the set access to the type of file operation.

7. The method according to claim 1, wherein the type of file operation includes a file operation for browsing contents of a file.

8. The method according to claim 7, wherein the type of file operation further includes a file operation for editing the contents of a file.

9. The method according to claim 7, wherein the type of file operation further includes a file operation for copying a file.

10. A non-transitory computer-readable storage medium storing a computer program to cause a file management terminal to perform the method according to claim 1.

11. An apparatus for managing a file, the apparatus comprising:
at least one processor and memory;
a receiving unit configured to periodically receive image data picked-up and input by a camera oriented toward a plurality of users who are to access a file together in a conference system that is accessed simultaneously by the plurality of users;
an identifying unit configured to identify a combination of authenticated personal identifications (IDs) of the plurality of users by recognizing faces of the plurality of users in the received image data by referring to a database to acquire a combination of personal IDs as the combination of authenticated personal IDs;
a setting unit configured to set an access right to a type of file operation for the file as permitted, in response to the combination of authenticated personal IDs satisfying a predetermined combination of personal IDs for permitting the type of file operation, and to cancel an access right to a type of file operation for the file as not permitted, in response to the authenticated personal IDs not satisfying the predetermined combination of personal IDs for permitting the type of file operation;
a storing unit configured to store permitted and not permitted access rights to respective files in association with the authenticated personal IDs in an access right database;
a displaying unit configured to display a list of shared file icons of files and a content of a file selected from the list of file icons, wherein each file icon represents the permitted and not permitted access right set for the type of file operation of the file associated with that file icon, and configured to display a pop-up window that displays access right information for a file denoted by an icon in response to moving a cursor of a mouse onto the icon;
a controlling unit configured to control a file operation for the file by the plurality of users based on the access right set for the type of file operation of the file;
an icon creation unit configured to create, for each of the plurality of displayed shared files, a file icon that graphically conveys determined permitted and not permitted access rights for a shared file;

a change unit configured to dynamically change a displayed file icon in response to change in the permitted and not permitted access right in the access right database for a file associated with that displayed icon;

a shared file control unit configured to receive instructions from an author of a file during file sharing to change a number of files in a shared folder located in a shared file database and, in response to the number of files in the shared folder located in the shared file database being changed, an access right change notification is sent out to the icon creation unit to acquire a status of the file access right; and a central processing unit configured to control at least one of the receiving unit, the identifying unit, the setting unit, the storing unit, the displaying unit, the controlling unit, the icon creation unit, the change unit, and the shared file control unit.

12. A file management terminal to control access to electronic files in a conference system that is accessed simultaneously by a plurality of persons, even when the author, right holder, or person in charge of contents of a target electronic file are not accessing the conference system, the file management terminal comprising:

a memory;

a personal authentication unit configured to receive face image data picked-up and input from a camera oriented toward the plurality of persons accessing the conference system and to compare the received face image data to stored face information to acquire personal IDs as authenticated personal IDs based on the receive face image data;

an access right management unit configured to determine, for each type of access to a target file, a permitted and not permitted access right to that target file based on both authenticated personal IDs received from the personal authentication unit and information in an access right management table, wherein each permitted and not permitted access right for a type of access to a target file in the access right management table is a based on a predetermined combination of personal IDs;

a storing unit configured to store permitted and not permitted access rights to respective files in association with the authenticated personal IDs in an access right database;

a displaying unit configured to display a list of shared file icons of files and a content of a file selected from the list of file icons, wherein each file icon represents the permitted and not permitted access right set for a type of file operation of the file associated with that file icon, and configured to display a pop-up window that displays access right information for a file denoted by an icon in response to moving a cursor of a mouse onto the icon;

a controlling unit configured to control a file operation for the file by the plurality of persons based on the access right set for the type of file operation of the file;

an icon creation unit configured to create, for each of the plurality of displayed shared files, a file icon that graphically conveys determined permitted and not permitted access rights for a shared file;

a change unit configured to dynamically change a displayed file icon in response to change in the permitted and not permitted access right in the access right database for a file associated with that displayed icon;

a shared file control unit configured to receive instructions from an author of a file during file sharing to change a number of files in a shared folder located in a shared file database and, in response to the number of files in the shared folder located in the shared file database being changed, the access right management unit sends out an access right change notification to the icon creation unit to acquire a status of the file access right; and a central processing unit configured to control at least one of the personal authentication unit, the access right management unit, the storing unit, the displaying unit, the controlling unit, the icon creation unit, the change unit, and the shared file control unit.

13. The file management terminal according to claim 12, wherein, for a first type of access to a first target file, the predetermined combination of personal IDs to permit the first type of access is a union of at least two personal IDs.

14. The file management terminal according to claim 13, wherein, in response to a start of file sharing, the access right management unit is configured to create the access right management table by extracting access rights from files located in a shared folder of a shared file database.

15. The file management terminal according to claim 14, wherein the access rights in the files located in the shared folder were set by authors of the files prior to the start of file sharing.

16. The file management terminal according to claim 14, wherein the access right management unit further is configured to change the access right management table during file sharing in response to a change in a number of files in the shared folder located in a shared file database.

17. The file management terminal according to claim 14, wherein the type of access right for the first target file includes an access right to browse the target file, an access right to change the target file, and an access right to copy the target file.

18. The file management terminal according to claim 12, wherein, in response to receiving an access right change notification from the access right management unit, the icon creation unit dynamically changes file icons based on the permitted/and not permitted access right in the access right database to a target file in a shared file database.

19. The file management terminal according to claim 18, wherein, if a file is not permitted to be browsed, the icon associated with that file is marked with a first one of an "X" on a face of the icon, grayed out, and outlined, wherein, if a file is not permitted to be changed, the icon associated with that file is marked with a second one of an "X" on a face of the icon, grayed out, and outlined, and wherein, if a file is not permitted to be copied, the icon associated with that file is marked with a third one of an "X" on a face of the icon, grayed out, and outlined.

20. The file management terminal according to claim 12, wherein, for a file permitted to be browsed, the icon associated with the file is presented as a normal display, wherein, for a file not permitted to be browsed, the icon associated with the file is altered from the normal display, wherein, for a file not permitted to be changed, the icon associated with the file is marked differently from the icon for a file not permitted to be browsed, and wherein, for a file not permitted to be copied, the icon associated with the file is marked differently from the icon for a file not permitted to be browsed and the icon for a file not permitted to be change.

21. The file management terminal according to claim 12, wherein the personal authentication unit additionally receives at least one of an image record of entering/leaving a conference room and a voiceprint from the camera and uses that to acquire personal IDs as authenticated personal IDs.

22. The file management terminal according to claim 12, further comprising:
- an input control unit configured to receive input information necessary to access a file from persons accessing the conference system; and
- a shared file control unit configured to receive a request to access a target file from a person accessing the conference system,
- wherein, in response to determining that the access right management unit has not determined permitted and not permitted access right to that target file, the shared file control unit does not permit access to the target file,
- wherein, in response to determining that the access right management unit has determined that browse access is permitted for the target file based on the plurality of persons accessing the conference system, the shared file control unit permits the target file to be browsed but not changed or copied, and
- wherein, in response to determining that the access right management unit has determined that change access is permitted for the target file based on the plurality of persons accessing the conference system, the shared file control unit permits the target file to be browsed and changed, but not copied.

* * * * *